Dec. 20, 1927.
L. DE FOREST
1,653,155
TALKING MOVING PICTURE EQUIPMENT
Filed April 28, 1923
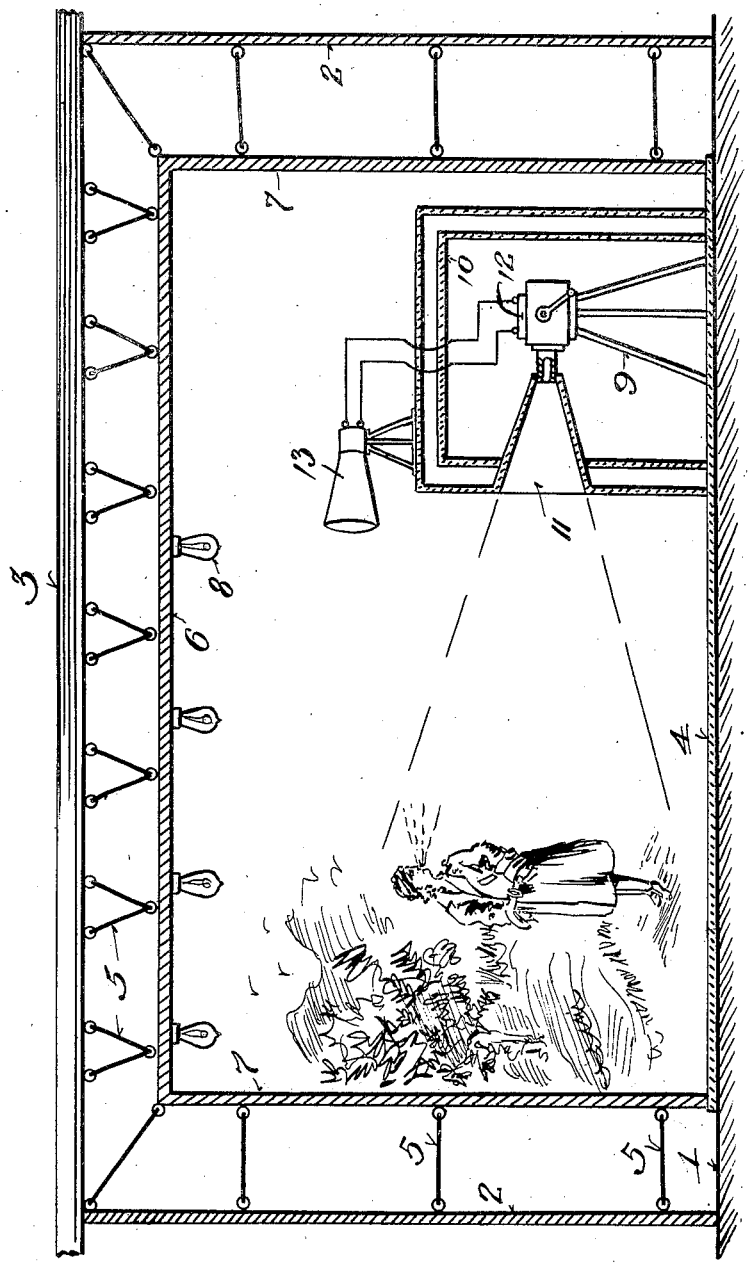
Inventor
Lee di Forest
by his attys Darby & Darby Patented Dec. 20, 1927.

1,653,155

UNITED STATES PATENT OFFICE.

LEE DE FOREST, OF NEW YORK, N. Y., ASSIGNOR TO DE FOREST PHONOFILM CORPORATION, OF NEW YORK, N. Y., A CORPORATION OF DELAWARE.

TALKING-MOVING-PICTURE EQUIPMENT.

Application filed April 28, 1923. Serial No. 635,333.

This invention relates to talking moving picture equipment, and more particularly the equipment used for simultaneously recording the sound waves and the picture waves, and has for its object the provision of means for efficient simultaneous photograph recording of sound and objects, which is simple, efficient and economical.

A further object of the invention is to provide means to prevent echoes, sound reflection or the like from affecting the sound record photographically made simultaneously with the picture record.

A further object of the invention is to provide a sound proof room which is equipped with the desired scenic effects to insure a pure sound record, the elimination of echoes, sound reflection, etc.

A further object of the invention is to provide means for preventing the noise of the operation of the motion picture camera from being recorded as part of the sound waves reported coincident with the operation thereof.

Further objects of the invention will appear more fully relative to arrangements of part of the invention, and will be more fully hereinafter set forth as shown in the accompanying drawing, and finally pointed out in the appended claims.

Referring to the drawing the single figure is a view in longitudinal, vertical section of a combined motion picture and sound picture studio equipped in accordance with my invention.

Referring to the drawing, to which I do not, however, desire to be restricted, as the same is merely a diagrammatic illustration of the principles of my invention, I show a studio consisting of a floor 1, and walls 2, with roof 3. I provide a heavy carpet 4, of soft material such as thick felt, to cover the floor of the studio, and in any suitable manner, for example, by means of spacing or hanging devices 5, form a relatively smaller room or studio, the ceiling and walls of which, 6 and 7, are of the same soft material, for example, thick felt. With this arrangement it will be readily seen that echoes, sound reflections, etc., are for all practical purposes, deadened and eliminated. It will be apparent that the scenic effect may be positioned in any desired manner, for example as illustrated, and lighting arrangements as desired and diagrammatically illustrated at 8, may be effected in the usual well known manner.

It is further among the purposes of my present invention to provide a sound proof booth for the motion picture apparatus 9. Such a booth is illustrated at 10 and as illustrative of the principles of my invention, is shown as of the double walled sound proof type. The lens of the motion picture apparatus fits in a small end of a horn 11, likewise provided with a thick coating of soft material such as felt.

The sound recording part of the apparatus is diagrammatically illustrated at 12, and mounted on the motion picture camera 9, and is connected electrically with the horn 13, which is suitably mounted within the studio, for example, on the top of the booth 10, the wires connected therewith passing through the booth to the sound recording apparatus 12 as illustrated.

It will be readily understood that many modifications of the principles of my invention will readily occur to those skilled in the art without departing from the spirit and scope of my invention as defined in the claims; but having now set forth the objects and nature of my invention, and having shown and described structures embodying the principles thereof, what I claim as new and useful and of my own invention, and desire to secure by Letters Patent is:

1. A talking moving picture studio comprising a room having its walls, ceiling and floor covered with an anti-sound reflecting material, a talking moving picture camera located in said room, a sound proof cabinet therefor having a light aperture therein, and a microphone exterior to said cabinet, located in said room, and electrically connected to said machine.

2. A talking moving picture studio comprising a room having its walls, ceiling and floor covered with a coating of felt, a talking moving picture camera located in said room, a sound proof cabinet therefor having a light aperture therein, and a microphone exterior to said cabinet, located in said room, and electrically connected to said machine.

3. A talking moving picture studio comprising a room having its walls offset from the normal boundaries thereof by a coating of anti-sound reflecting material, a talking moving picture camera located in said room, a sound proof cabinet therefor having a light aperture therein, and a microphone exterior to said cabinet, located in said room and electrically connected to said machine.

4. A talking moving picture studio comprising a room having its walls offset from the normal boundaries thereof by a coating of felt, a talking moving picture camera located in said room, a sound proof cabinet therefor having a light aperture therein, and a microphone exterior to said cabinet, located in said room, and electrically connected to said machine.

In testimony whereof I have hereunto set my hand on this 25th day of April, A. D., 1923.

LEE DE FOREST.